April 20, 1937.　　　F. J. STOKES ET AL　　　2,077,647
FILLING AND CLOSING MACHINE
Filed June 18, 1930　　　2 Sheets-Sheet 1

WITNESS:

INVENTORS
Francis J. Stokes and
Charles J. Westin
BY
Augustus B. Stoughton
ATTORNEY.

April 20, 1937. F. J. STOKES ET AL 2,077,647
FILLING AND CLOSING MACHINE
Filed June 18, 1930 2 Sheets-Sheet 2

WITNESS:

INVENTORS
Francis J. Stokes, and
Charles J. Westin
BY
Augustus B. Stoughton
ATTORNEY.

Patented Apr. 20, 1937

2,077,647

UNITED STATES PATENT OFFICE 2,077,647

FILLING AND CLOSING MACHINE

Francis J. Stokes and Charles J. Westin, Philadelphia, Pa., assignors to F. J. Stokes Machine Company, Philadelphia, Pa., a corporation of Pennsylvania Application June 18, 1930, Serial No. 461,884

4 Claims. (Cl. 113—27)

Objects of the present invention are to provide in an efficient, reliable, and automatic machine, operative with containers of widely different diameters, and adapted, if desired, to raise containers to a non-dripping filling nozzle and to fill them and to lower the filled containers; means to mark or emboss the lids, and to guide, seat and apply the embossed lids and to control the operations above mentioned in such manner that in the absence of containers the filling mechanism and lid feeding mechanism are inoperative. Another object of the present invention is to provide for convenience in cleaning the machine parts so that changes can readily be made from one kind of filling material to another. Other objects of the invention will appear from the following description.

The invention comprises the improvements to be presently described and finally claimed.

In the following description reference will be made to the accompanying drawings forming part hereof and in which Figure 1 is a front view of a machine embodying features of the invention with parts broken away and looking towards the filling mechanism.

Figure 2:
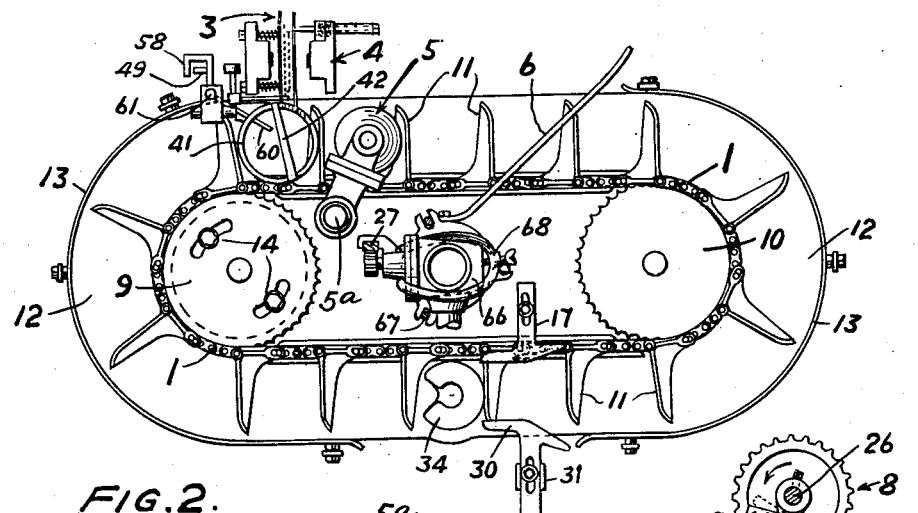
Fig. 2 is a top or plan view with some parts of the superstructure omitted.

Referring to the drawings, there is a conveyor 1 driven with an intermittent motion, and at periods of rest it presents a container or a series of containers axially to the filling mechanism, generally indicated at 2, and which is inoperative unless a container is presented to it, and the conveyor presents a filled container to a lid feed mechanism, generally indicated at 3, and which is inoperative unless a filled container is presented to it. The lid feed mechanism 3 includes an embossing press, generally indicated at 4, which serves to stamp letters or characters on the lids before they are applied to the containers. The conveyor 1 also presents a filled container to which a lid has been applied to a lid closer, generally indicated at 5, and to a scrape-off device 6. The parts above indicated and one, but not the only, form of mechanism for working and controlling them will now be described.

Power is applied to the shaft 7 and from it to the filling mechanism through a clutch device, generally indicated at 8, and therefore intermittently. Power from the shaft 7 is applied continuously to the other moving or actuating parts of the machine.

The conveyor 1, in the form illustrated, includes a chain, shown to run around two sprocket or toothed wheels 9 and 10, and provided with fingers 11 of which the leading edges serve to push containers along a path 12 provided with a guide rail 13. The conveyor is adapted to accommodate containers of different diameters, shapes and heights within wide limits. The sprocket wheel 9 is adjusted by the screws and slots 14, so that containers of different sizes can be positioned in alignment with the nozzle 16 when the conveyor pauses. The guide 17 together with the finger 30 serves to put the containers in position to stop directly under the nozzle 16.

Figure 1:
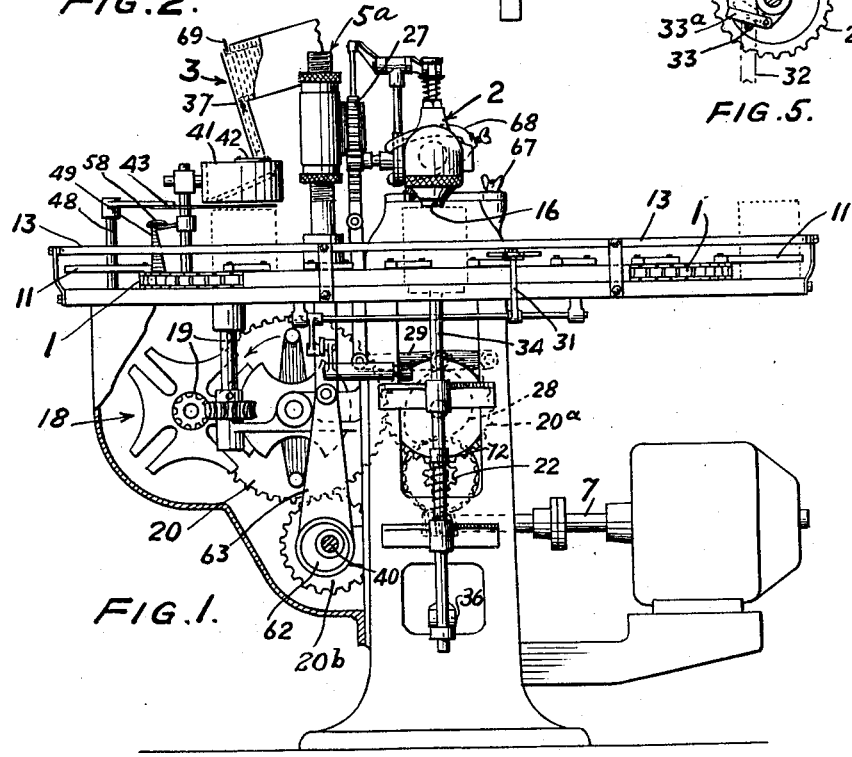

Intermittent motion is imparted to the sprocket wheel 9 and to the conveyor 1 by the Geneva stop motion mechanism 18, acting through the worm gear and shaft 19, Fig. 1. The Geneva stop motion mechanism is driven by the toothed gears 20 and 20$^a$ constantly driven from the shaft 7 through worm and worm wheel 21 and worm wheel shaft and toothed wheel 22. There is provided means whereby the conveyor 1 is moved with a rapid, intermittent motion but with relatively slow acceleration and deceleration, so that the material in the containers is not likely to be spilled. This means, as is best seen in Fig. 1, consists of the double-arm Geneva driver mounted on gear 20 and carrying at its ends two pins which successively co-operate in turn with one of the four slots in Geneva gear 18. The two arms of the Geneva driver are placed 180° apart so that, for each complete revolution of the driver, two consecutive slots of the Geneva star 18 are engaged by the arms and thereby the Geneva star is given two consecutive motions of a quarter-turn or 90° each. Because of our novel arrangement of the double-arm or Geneva driver, in combination with the proper gearing, the speed of the conveyor chain 1 is reduced to one-half, permitting us to operate the machine at twice the old production rate, without disturbing or shaking out the contents of the filled containers.

Figure 5:
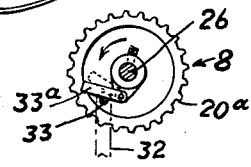
Fig. 5 is a detail view of a clutch.
Figures 3, 4:
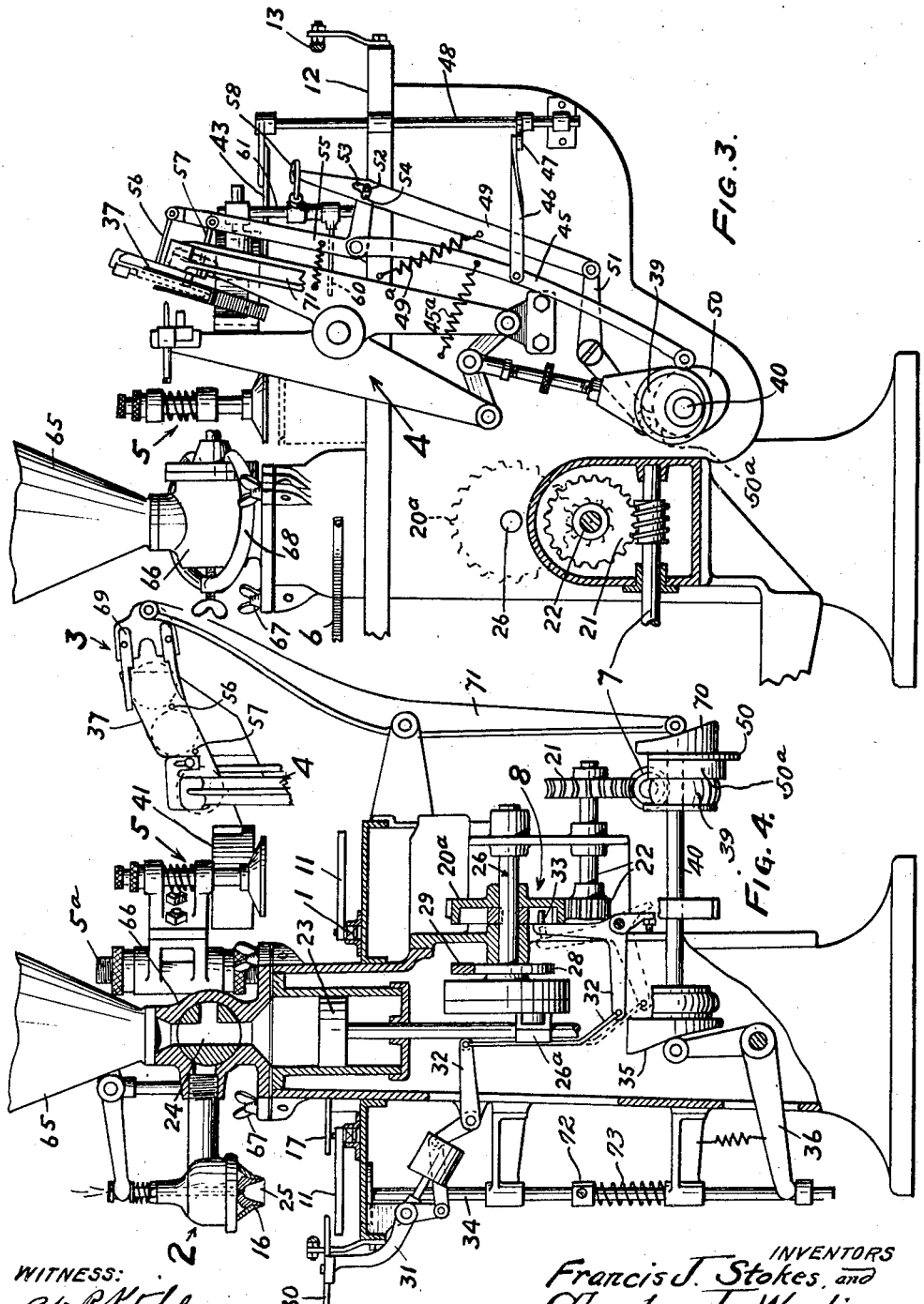
Fig. 3 is a rear view with parts broken away.
Fig. 4 is a transverse view mostly in central section.

The pump plunger 23, and the intake valve 24 and the nozzle cut-off valve 25 are driven from the shaft 26, connectable and disconnectable in respect to the driven wheel 20$^a$ through the clutch 8, Figs. 4 and 5.

The plunger 23 is connected with shaft 26 by crank mechanism 26$^a$, and there is a rack bar 27, Fig. 1, reciprocated by cam 28, Fig. 4, through lever 29. The rack bar operates the intake valve 24 of the pump and also the cut-off valve 25 of the nozzle. The finger 30, Figs. 2 and 4, normally disposed in the path of an oncoming container, is mounted on a weighted bell crank lever 31, connected by linkage 32 with the pin 33, Fig. 5, which operates upon the latch 33a, and serves to connect the clutch when a container operates upon the finger 30 and to disconnect the clutch when no container operates upon the finger 30. There is thus provided a no container, no fill control. It may be remarked that the cut-off valve 25 is vented through its stem to the atmosphere, but the valve structure is not claimed herein in detail as it forms the subject-matter of Patent No. 1,843,701, issued Feb. 2, 1932.

At a dwell in the travel of conveyor 1 and in the case of containers with wide mouths, such as cans, the container comes to a position of rest for filling and is not lifted, but when material has to be introduced through a small opening the container may be raised up to the nozzle 25, by the spring pressed lifter 34, Figs. 1 and 4, actuated by the cam 35 and bell crank lever follower 36, Fig. 4. At the same time material, previously drawn into the cylinder of the pump, is ejected by the pump piston through the nozzle into the lifted container which is then lowered.

It may be remarked that in the case of containers with wide mouths, the mechanism including the spring pressed lifter 34, actuated by the cam 35, and bell crank lever follower 36, are omitted or put out of action, whereas with containers where the material has to be introduced through a small opening, the mechanism last referred to is present and is in action.

This is accomplished by loosening the collar 72 upon which the spring 73 bears. Lever 36 only acts in the downward direction to compress spring 73 so that when collar 72 is loose on shaft 34 spring 73 is not compressed and does not actuate shaft 34 upward.

Lids fed by the chute 37 pass between the jaws of the lid marking or embossing press 4 of the toggle type, actuated by an eccentric 39, on the shaft 40 driven in a continuous manner, and they fall, one at a time, into the ring 41, under the bar 42, if present, and flatwise onto the shutter 43, Figs. 1 and 3. The shutter 43 is turned out of the way permitting the lid to drop onto a filled container during a dwell in the movement of the conveyor 1. The shutter is turned by a cam 50a, Fig. 3, on cam shaft 40, Fig. 3, acting through the follower 45, link 46, crank arm 47, and turnable post 48. The follower 45 is pressed against cam 50a by the spring 45a. In the absence of a container there is no lid feed. This is accomplished as follows: The bar 49 is continuously oscillated endwise by the cam 50 and bell crank lever follower 51, Fig. 3. The bar 49 has two radial positions in respect to its point of pivotal connection with the lever 51. In one of these positions, shown in Fig. 3, a pin 52 on bell crank lever 55 rides up and down in one portion 53 of a slot, having another portion 54 disposed at right angles to the part 53, so that the bell crank lever 55 remains at rest. The bell crank lever 55 is connected with pins 56 and 57 arranged crosswise of the path of the lids and adapted by withdrawal to feed the lids singly into the embossing press as the pin 52 is engaged by portions 54 of the slot and thus swings the bell crank lever 55 out. With pin 52 as shown in Fig. 3, the bell crank lever 55 remains at rest and pins 56 and 57 prevent the lids from being fed into the press. It is the hook 58 that positions the arm 49 in Fig. 3, and the hook is connected with a finger 60, Fig. 2, disposd in the path of the oncoming containers, so that a container striking the finger 60 turns the shaft 61 and the hook 58 and presses upper end of link 49 to the right in Fig. 3 and holds it with portion 54 of slot 53 engaged with pin 52. In that position of the pin, motion is imparted by it to the bell crank lever 55, and the pins 56 and 57, being withdrawn from the path of the lids, feed them singly. The spring 49a, Fig. 3, acts upon the bar 49 and through it acts upon the hook 58 and fingers 60 to return them to initial position.

At the next dwell in the movement of the conveyor 1, the plunger 5 is brought down and secures the lids onto the containers, or caps the containers. In Fig. 1, the eccentric 62 and rod 63 serve to operate the plunger 5. The rod 63 carries the strap of the eccentric 62, and the rod 63 has jointed connection with the stem 5a, Fig. 2, of the plunger, which is guided for movement in a straight line. The wiper 6, Fig. 2, serves to deliver the filled, capped and embossed containers from the machine.

It is a feature that certain parts are made in sections and can be readily disassembled for cleaning and reassembled for use. The hopper 65 and valve casing 66 are removable by the pivotal thumb screws 67, giving access to the pump cylinder parts, and the valve casing is removable from the hopper, and its sections can be released by the yoke clamp 68.

69, Fig. 4, is a fork operated by a cam 70, through the intervention of a pivotal lever 71 and it operates where the lids are dropped from the magazine into the portion of the chute, Fig. 1, to separate single lids from the nested supply of lids.

It will be obvious to those skilled in the art to which the invention relates that modifications may be made in details of construction and arrangement and matters of mere form without departing from the spirit of the invention which is not limited to such matters or otherwise than the prior art and the appended claims may require.

We claim:

1. In an automatic filling and closing machine, the combination of, a conveyor for moving a plurality of containers, a magazine for containing a plurality of lids for said containers, a gravity chute for conveying individual ones of said lids from said magazine to a position above said conveyor to which position filled containers are conveyed, first means for passing said lids one-by-one from said magazine to said chute, mechanism for marking said lids while in said chute, and second means actuated by a container for feeding a lid from said chute onto said container.

2. In an automatic filling and closing machine, the combination of, first means for moving a plurality of containers, a magazine for containing a plurality of lids for said containers, a sloping chute for receiving lids from said magazine and conveying them by gravity, second means for passing lids one-by-one from said magazine to said chute, an annular ring located above the containers on said first means and beneath the lower end of said chute, third means interposed between the upper end of said chute and said ring for passing lids one-by-one from said chute to said ring, fourth means beneath said ring for retaining a lid therein and for depositing a lid from said ring onto a container beneath, and fifth means responsive to one of said containers for actuating said third means.

3. In an automatic filling and closing machine, the combination of, first means for moving a plurality of containers, a magazine for containing a plurality of lids for said containers, a sloping chute for receiving lids from said magazine and conveying them by gravity, second means for passing lids one-by-one from said magazine to said chute, an annular ring located above the containers on said first means and beneath the lower end of said chute, a bar across the top of said ring, third means interposed between the upper end of said chute and said ring for passing lids one-by-one from said chute to said ring, fourth means beneath said ring for retaining a lid therein and for depositing a lid from said ring onto a container beneath, and fifth means responsive to one of said containers for actuating said third means.

4. In an automatic filling and closing machine, the combination of, a conveyor for moving a plurality of containers, a magazine for containing a plurality of lids for said containers, a gravity chute for conveying individual ones of said lids from said magazine to a position above said conveyor to which position filled containers are conveyed, a pivotally mounted lever for passing lids one-by-one from said magazine to said chute, a second pivotally mounted lever having one end moving into and out of said chute for feeding a lid from said chute, an embossing press having actuating jaws acting upon a lid in said chute, a toggle for actuating said embossing press, a shutter mounted to feed lids one-by-one from said chute to a container on said conveyor, and a pivotally mounted lever interposed in the path of the containers on said conveyor and controlling the actuation of said second lever so as to control the feed of said lids.

FRANCIS J. STOKES.
CHARLES J. WESTIN.